US011156720B1

(12) United States Patent
Koltuniak

(10) Patent No.: US 11,156,720 B1
(45) Date of Patent: Oct. 26, 2021

(54) RTK/GNSS FORENSIC EVIDENCE MARKER

(71) Applicant: Andrew Thomas Koltuniak, San Francisco, CA (US)

(72) Inventor: Andrew Thomas Koltuniak, San Francisco, CA (US)

( * ) Notice: Subject to any disclaimer, the term of this patent is extended or adjusted under 35 U.S.C. 154(b) by 0 days.

(21) Appl. No.: 16/528,860

(22) Filed: Aug. 1, 2019

Related U.S. Application Data

(60) Provisional application No. 62/806,803, filed on Feb. 16, 2019.

(51) Int. Cl.
| | |
|---|---|
| *H04N 7/18* | (2006.01) |
| *G01S 19/14* | (2010.01) |
| *G01S 19/43* | (2010.01) |
| *G06F 16/29* | (2019.01) |
| *G06F 16/51* | (2019.01) |

(52) U.S. Cl.
CPC .............. *G01S 19/14* (2013.01); *G01S 19/43* (2013.01); *G06F 16/29* (2019.01); *G06F 16/51* (2019.01)

(58) Field of Classification Search
CPC .......... G01S 19/14; G01S 19/43; G01S 16/29; G01S 16/51
USPC .......................... 348/144, 143, 151, 135, 136
See application file for complete search history.

(56) References Cited

U.S. PATENT DOCUMENTS

| 4,454,658 A | * | 6/1984 | Lewis | G01W 1/12 33/268 |
| 2003/0113906 A1 | * | 6/2003 | Sangha | C12Q 1/6806 435/287.2 |
| 2013/0261958 A1 | * | 10/2013 | Herron | G08G 1/143 701/428 |

* cited by examiner

*Primary Examiner* — Robert Chevalier
(74) *Attorney, Agent, or Firm* — Aslan Law, P.C.

(57) ABSTRACT

A crime scene is recorded as to the locations of key evidence such as a knife in relation to a victim's body. The criminalist places a stand next to each piece of evidence. An onboard RTK/GNSS receiver displays the latitude, longitude and altitude of each marker. Additional data such as case number, classification of evidence, number assigned to evidence, weather and comments can be entered into the RTK/GNSS device remotely or by a keyboard attached to the marker. A photo is taken of each marker screen. A UAV is launched over the field of evidence. A local transmission of the RTK/GNSS data can be sent to and stored in a portable electronic device. That device can send the data to a UAV and/or to a central computer. The central computer can use the recorded coordinates to visually recreate the crime scene to a jury years later with accurate representation of relational data among all the items of evidence.

20 Claims, 9 Drawing Sheets

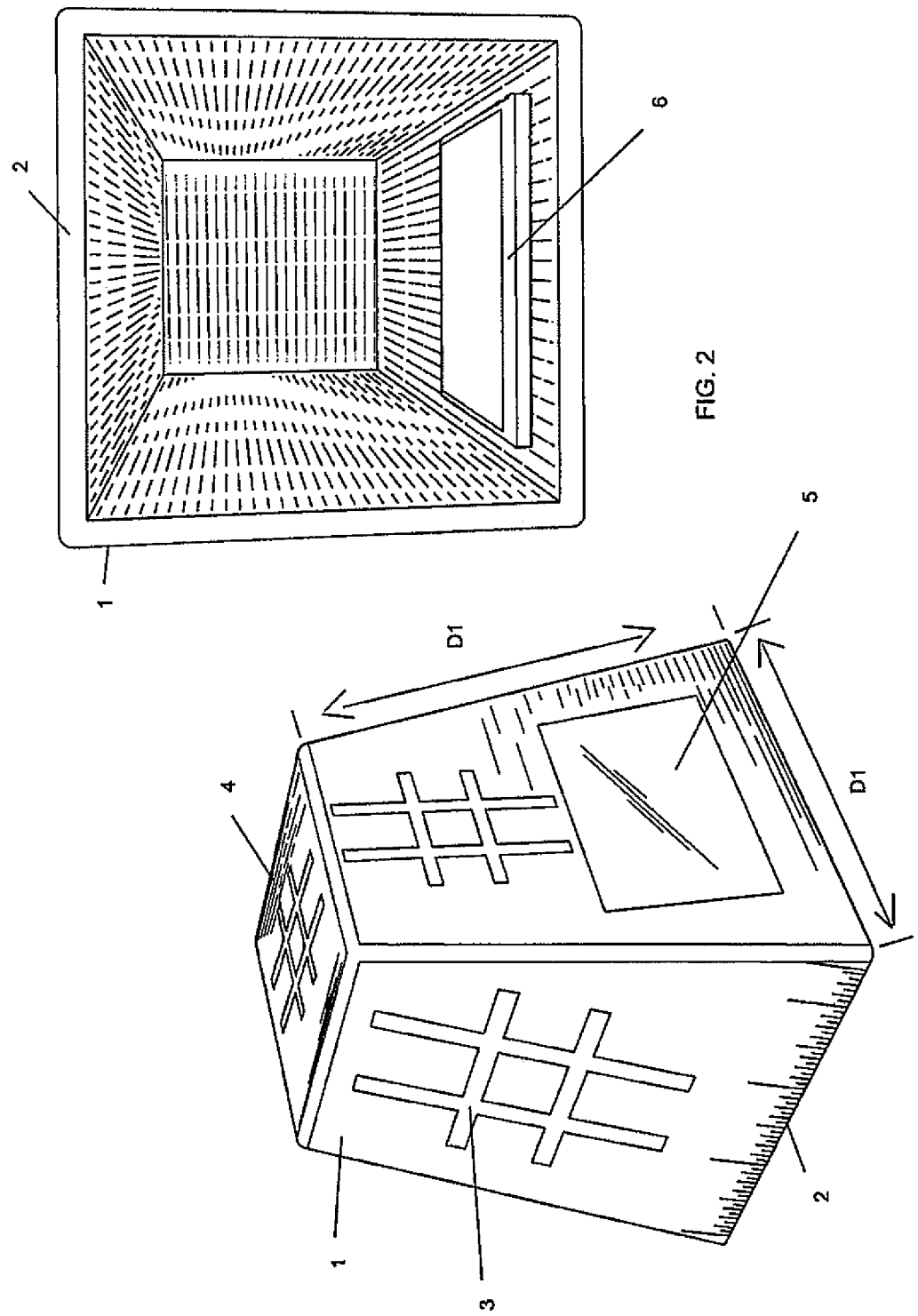

RTK/GNSS FORENSIC EVIDENCE MARKER

CROSS REFERENCE APPLICATIONS

This non-provisional application claims priority to provisional application Ser. No. 62/806,803 filed Feb. 16, 2019 which is incorporated by reference herein in its entirety.

FIELD OF INVENTION

This invention relates generally to the field of forensics. More particularly, this invention relates to evidence markers that will assist in permanently memorializing and creating a record of the exact location of items with evidentiary value. This invention will provide accurate data of the specific altitude, longitude and latitude of individual items as well as the distance and geographic relationship to other marked items.

BACKGROUND OF THE INVENTION

Present crime scene forensic reconstruction comprises placing evidence markers at locations where key evidence, such as a knife, was located when the crime scene was frozen. Photographs are taken. Detectives make notes and/or recordings. This compilation of data may get stored for several years before it is presented to a jury. Problems persist as to actual reproduction of accurate relative distances between various pieces of evidence. The primary use is outdoor crime scenes. Indoor use may not work well due to lack of available signals. For example, was the knife within an easy reach of the murder victim? A photograph, four years later, without the photographer present, because they retired, may not have a scaled distance recorded. Thus, a perspective view of the alley showing a knife marker and a body marker could not show, within three to six feet, how far the knife was from the body. This could be especially true if the photographer kneeled while taking the picture from the feet to over the head with the knife an unknown distance over the head on the floor. The camera takes a single point perspective view which creates a vanishing point. Was the knife one foot or ten feet away? When looking down railroad tracks you cannot tell if the far away railroad ties are next to each other or ten feet apart? These missing facts can reduce the weight of an expert's testimony in the crime scene analysis. Did the victim even know a knife was on the ground ten feet away? Or did the victim drop the knife as they died?

What is needed in the art is an apparatus and method to accurately record the precise latitude, longitude and altitude of every piece of evidence at a crime scene.

The present invention provides a RTK/GNSS receiver displaying these coordinates on a screen at every piece of evidence. This data can be photographed and/or sent to recording computers for future trial use.

SUMMARY OF THE INVENTION

The main aspect of the present invention is to provide economically viable RTK/GNSS location indicators at a crime scene to provide accurate representation of evidence location data years later.

Another aspect of the present invention is to provide a photographic record of the data.

Another aspect of the present invention is to provide a local computer capture of the data.

Another aspect of the present invention is to provide a remote computer capture of the data.

Another aspect of the present invention is to provide a visual scene reconstruction of the scene using the data.

Another aspect of the present invention is using an Unmanned Aerial Vehicle (UAV) photos/videos of evidence at the scene.

Another aspect of this invention allows for the UAV to use the recorded coordinates to return to the precise location of evidence at any point in the future.

Other aspects of this invention will appear from the following description and appended claims, reference being made to the accompanying drawings forming a part of this specification wherein like reference characters designate corresponding parts in the several views.

The foregoing problems are solved and a technical advance is achieved with the RTK/GNSS evidence marker's ability to accurately memorialize and characterize an item's location and orientation at a crime scene. The invention will be compose a 6", four sided cone, the top will terminate into a 2"×2" square. These will be constructed from yellow plastic. Each cone will be individually marked on all 4 sides and the top with a number to correspond with the item of evidence it will identify. The base of each side will be marked with a 6" ruler with standard and metric increments. Each cone will have a 3 axis digital compass and multi band, multi constellation RTK GNSS receiver that will provide precision coordinates displayed on a screen at the base of one side of the cone.

The data can be photographed at each marker and/or sent to a local computer and/or sent to a remote central computer. This electronic data can feed an electronic scene recreation software package.

From a legal point of view this added data can help qualify a crime scene expert and/or help add to the weight of the experts' opinions regarding evidence location at the crime scene years later.

Expert Opinion, Crime Scene Analysis, and Profiling Evidence

[1] A witness may testifyas an expert, in the form of an opinion, on "a subject that is sufficiently beyond common experience that the opinion of an expert would assist the trier of fact." (Evid. Code, § 801, subd.(a). Admission of expert witness opinion testimony reviewed under the deferential abuse of discretion standard of review, (People v. Fuiava (2012) 53 Cal.4th 622, 672, 137 Cal.Rptr.3d 147, 269 P. 3d 568; People Wallace (2008)44 Cal.4th 1032, 1062-1063, 81 Cal.Rptr.3d 651, 189 P. 3d 911.) [2] [3] Crime scene analysis that is "relevant, probative, and not unduly prejudicial" is admissible in a criminal action. (People v. Eubanks (2011) 53 Cal.4th 110, 148, 134 Cal.Rptr.3d 795, 266 P. 3d 301; see People v. Robinson (2005) 37 Cal.4th 592, 643-644, 36 Cal 0.3 d 760, 124 P. 3d 363.) Expert opinion testimony on crime scene analysis is not prohibited on the ground the jurors may have some understanding of the sequence of events as a matter of common sense, because "[e]xpert opinion on crime scene reconstruction generally is admissible" (People v. Farnam (2002) 28 Cal.4th 107, 162, 121 Cal.Rptr.2d 106, 47 P. 3d 988), and the jury need not be wholly ignorant of the subject matter of the opinion in order to justify its admission (People v. McAlpin (1991) 53 Cal.3d 1289, 1299-1300, 283 Cal.Rptr.382, 812P. 2d 563(McAlpin)). "Notwithstanding the ability of jurors to review the evidence before them and draw commonsense inferences, it may aid them to learn from a person with extensive training in crime scene analysis, who has examined not only the evidence in the particular case but has in mind his or her experience in analyzing hundreds of other cases, whether certain features that appear in all the charged crimes are comparatively rare, and therefore suggest in the expert's opinion that the crimes were committed by the same person." People v. Prince (2007) 40 Cal.4th 1179, 1223, 57 Cal.Rptr.3d 543, 156 P. 3d 1015 (Prince).

BRIEF DESCRIPTION OF THE DRAWINGS

FIG. 1 is a front perspective view of an evidence marker with a built in RTK/GNSS location indicator.

FIG. 2 is a bottom plan view of the evidence marker shown in FIG. 1

Figure 3:
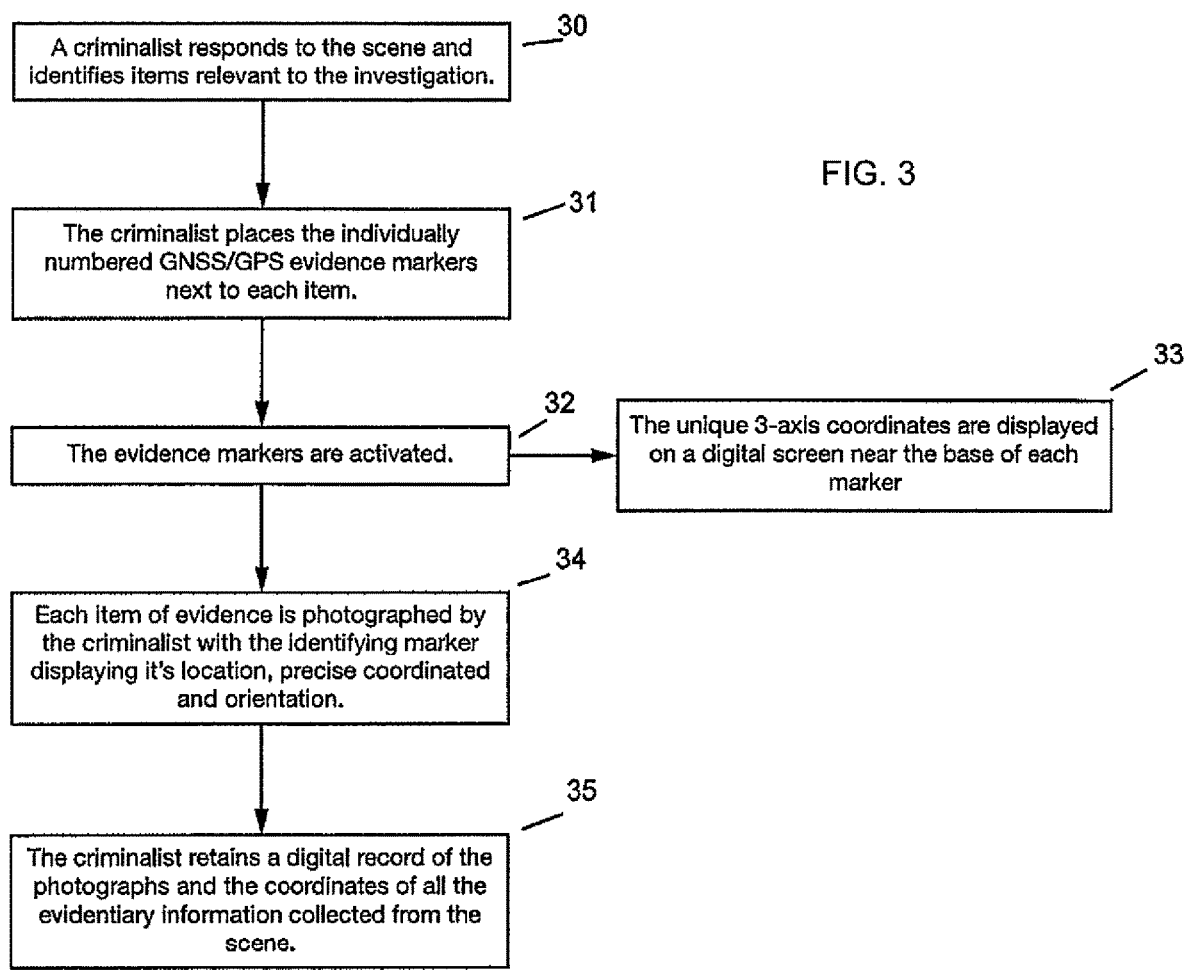
FIG. 3 is a flowchart of a first embodiment of the system.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Referring first to FIGS. 1, 2 an evidence marker 1 could be a yellow plastic stand. A ruler 2 may be designated into one or more bottom edges. Cutouts 3 can help reduce wind friction. A flat top 4 could be used to support weights or props. A screen 5 indicates latitude, longitude, altitude and optionally, case number (entered remotely or by a keyboard not shown), evidence number, evidence classification, weather, comments. A RTK/GNSS processor 6 could be an RTK GNSS receiver such as a commercial offering trademarked U-Blox ZED-F9P.

Multi-band receiver delivers centimeter-level accuracy in seconds. Concurrent reception of GPS, GLONASS, Galileo and BeiDou. Multi-band RTK with fast convergence times and reliable performance. High update rate for highly dynamic applications.

Centimeter accuracy in a small and energy-efficient module. Easy integration of RTK for fast time-to-market.

The ZED-F9P positioning module features the new u-blox F9 receiver plat form, which provides multi-band GNSS to high volume industrial applications in a compact form factor. ZED-F9P is a multi-band GNSS module with integrated u-blox multi-band RTK technology for centimeter-level accuracy. The module enables precise navigation and automation of moving industrial machinery by means of a small, surface mounted module.

The ZED-F9P module is designed for easy integration and low design-in costs with minimal e-BOM. It is well-suited for mass market adoption, thanks to its small package size, light weight, and small power consumption.

ZED-F9P ensures the security of positioning and navigation information by using secure interfaces and advanced jamming and spoofing detection technologies.

ZED-F9P offers support for a range of correction services allowing each application to optimize performance according to the application's individual need. ZED-F9P comes with built-in support for standard RTCM corrections, supporting centimeter-level navigation from local base stations or from virtual reference stations (VRS) in a Net work RTK set up.

The module can be upgraded to support future SSR-type correction services suitable for mass market penetration. lox modules a remanufactured in IS O/TS 16949 certified sites and are fully tested on a system level. Qualification tests are performed as stipulated in the ISO16750 standard: "Road vehicles—Environmental conditions and testing for electrical and electronic equipment".

Referring next to FIG. 3 the basic first embodiment is shown. The criminalist first decides what evidence is relevant 30. Next, criminalist places markers 1 at each relevant piece of evidence at 31. The markers 1 are turned on at 32 and at a minimum assigned a number on the screen 5 or labeled or both. As noted above additional data can be entered. XYZ coordinates are indicated on screen 5 plus any additionally entered data at 33. Criminalist photographs each marker 1 at 34. Criminalist electronically stores at 35 the photos taken in step 34.

Figure 4:
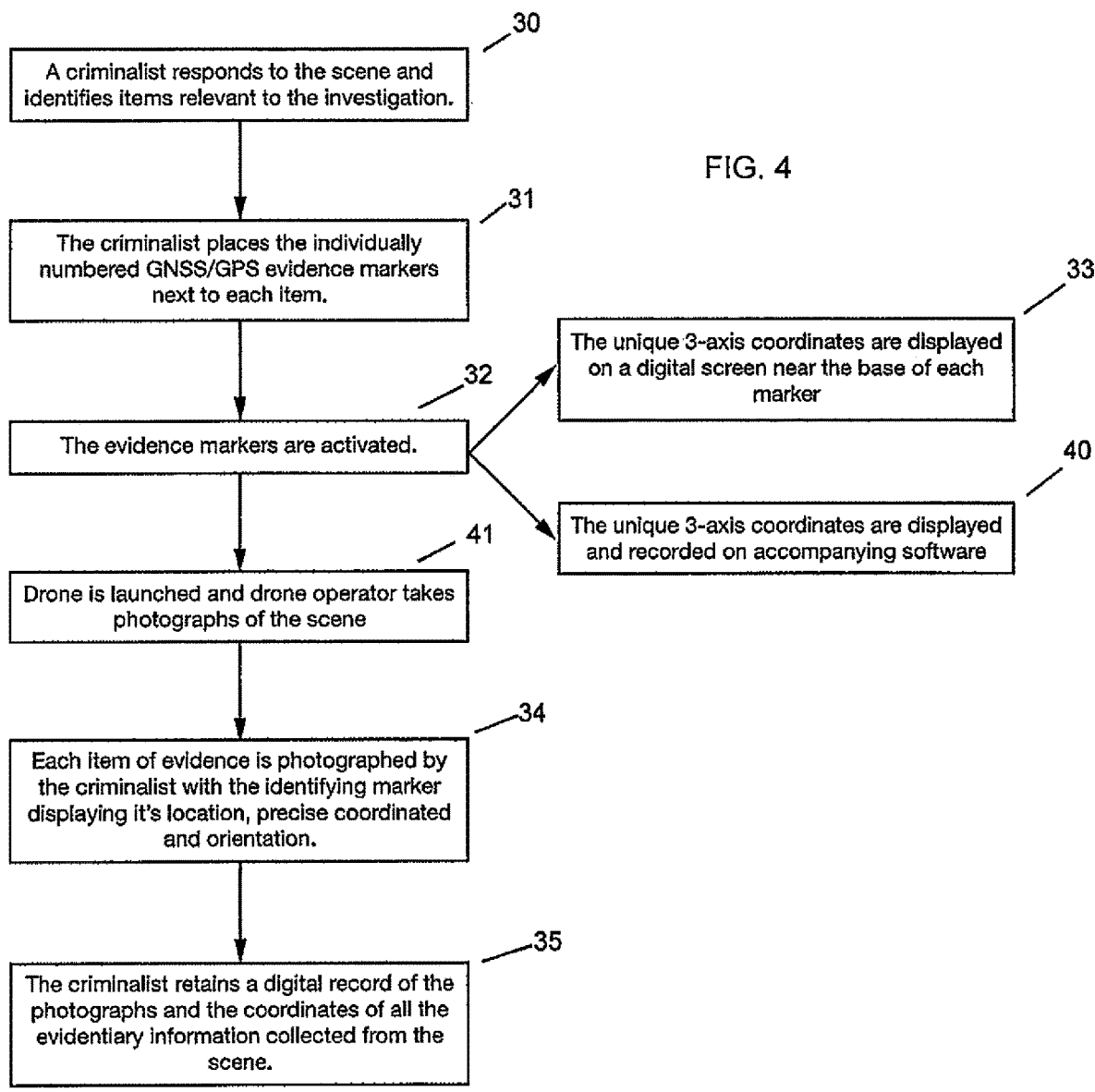
FIG. 4 is a flowchart of a second embodiment of the system.

Referring next to FIG. 4 new step 40 uses a portable electronic device such as an iPad with bluetooth to record data from each marker 1. Step 41 uses a UAV to memorialize the field of evidence.

Figure 5:
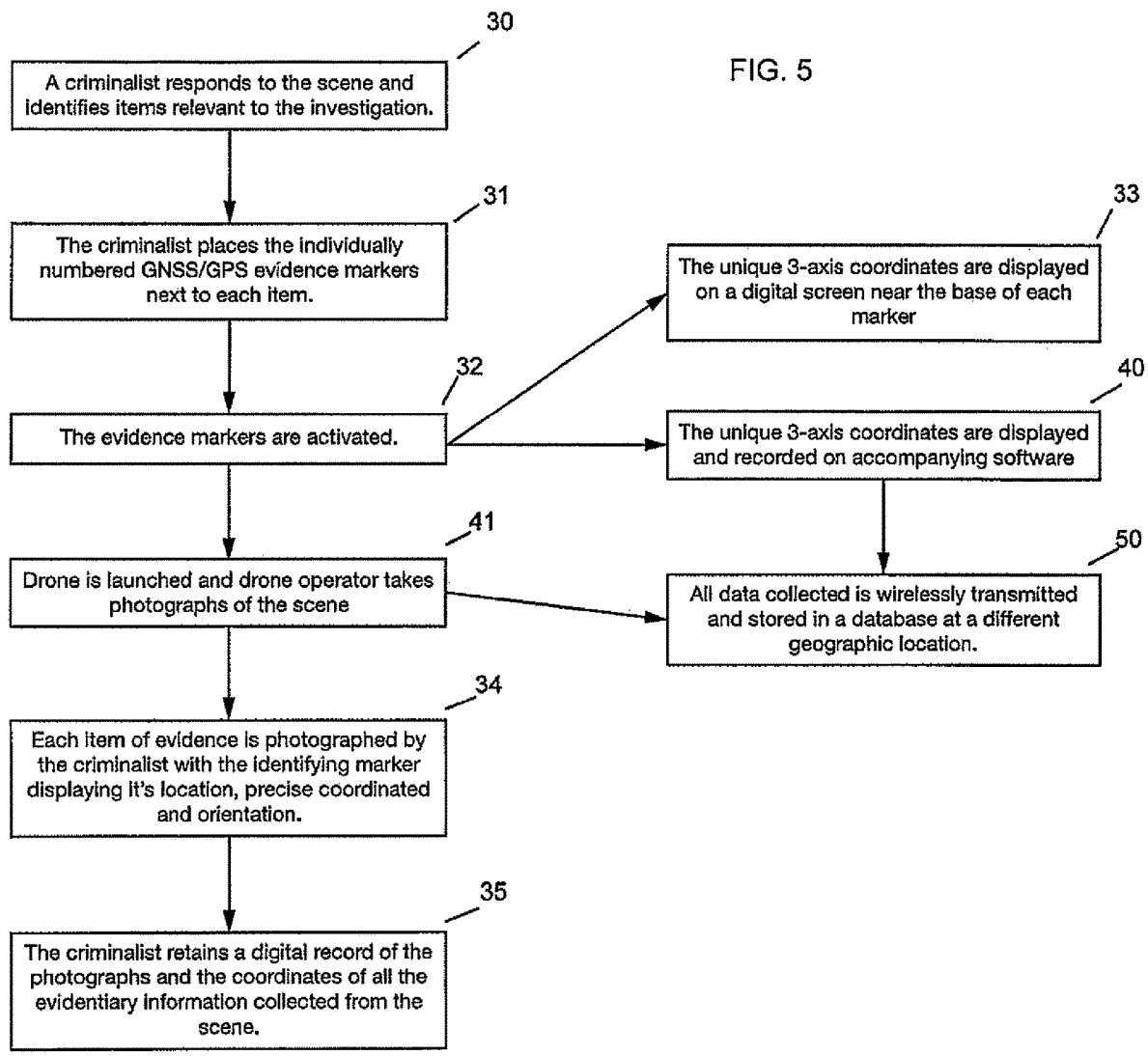
FIG. 5 is a flowchart of a third embodiment of the system.

Referring next to FIG. 5 a new step 50 sends the data from step 40 to a remote central processor.

Figure 6:
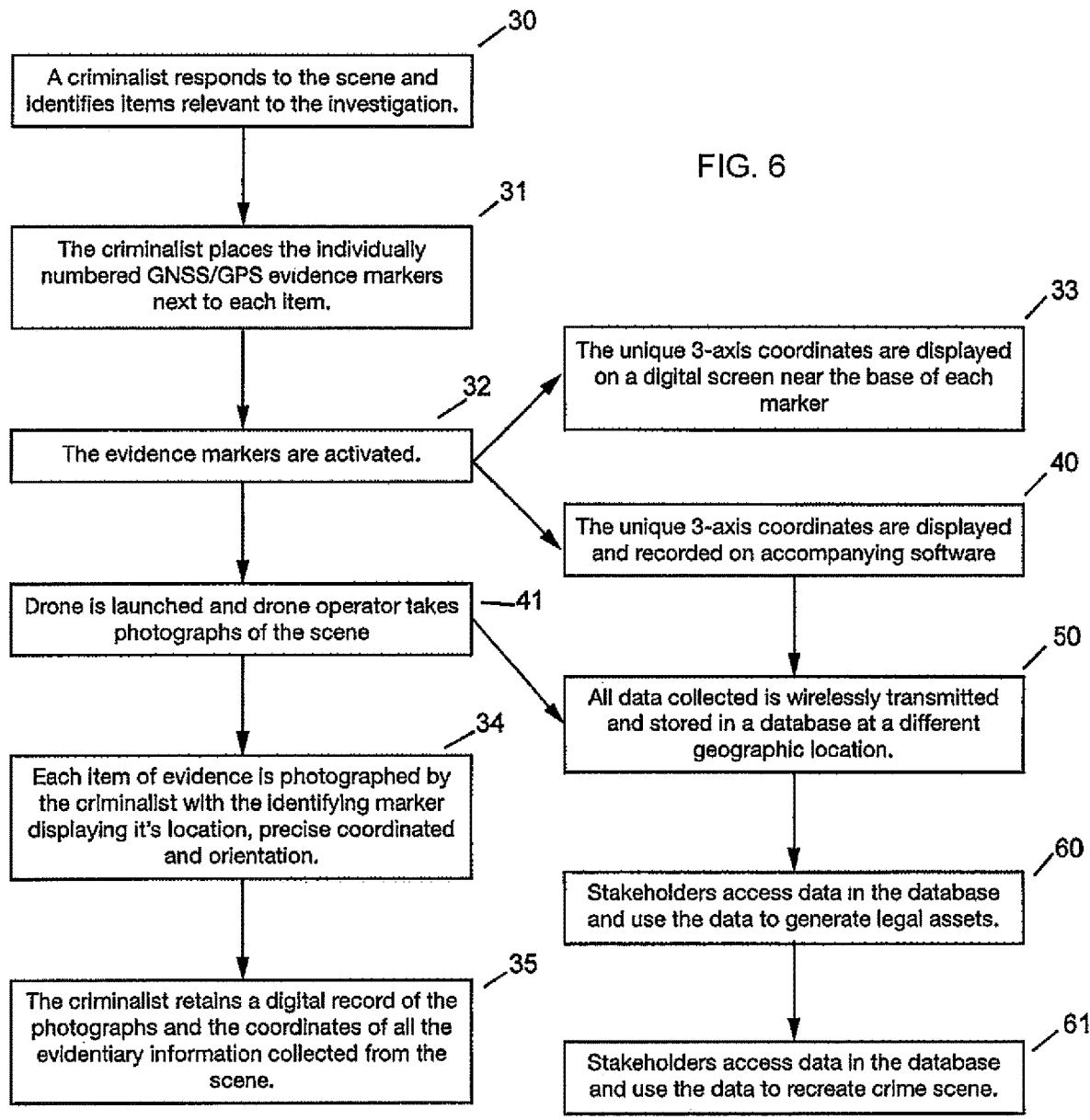
FIG. 6 is a flowchart of a fourth embodiment of the system.

Referring next to FIG. 6 new step 60 shows prosecutors and the like using the data for crime analysis. Step 61 uses the data in software to recreate the crime scene years later.

Figure 7:
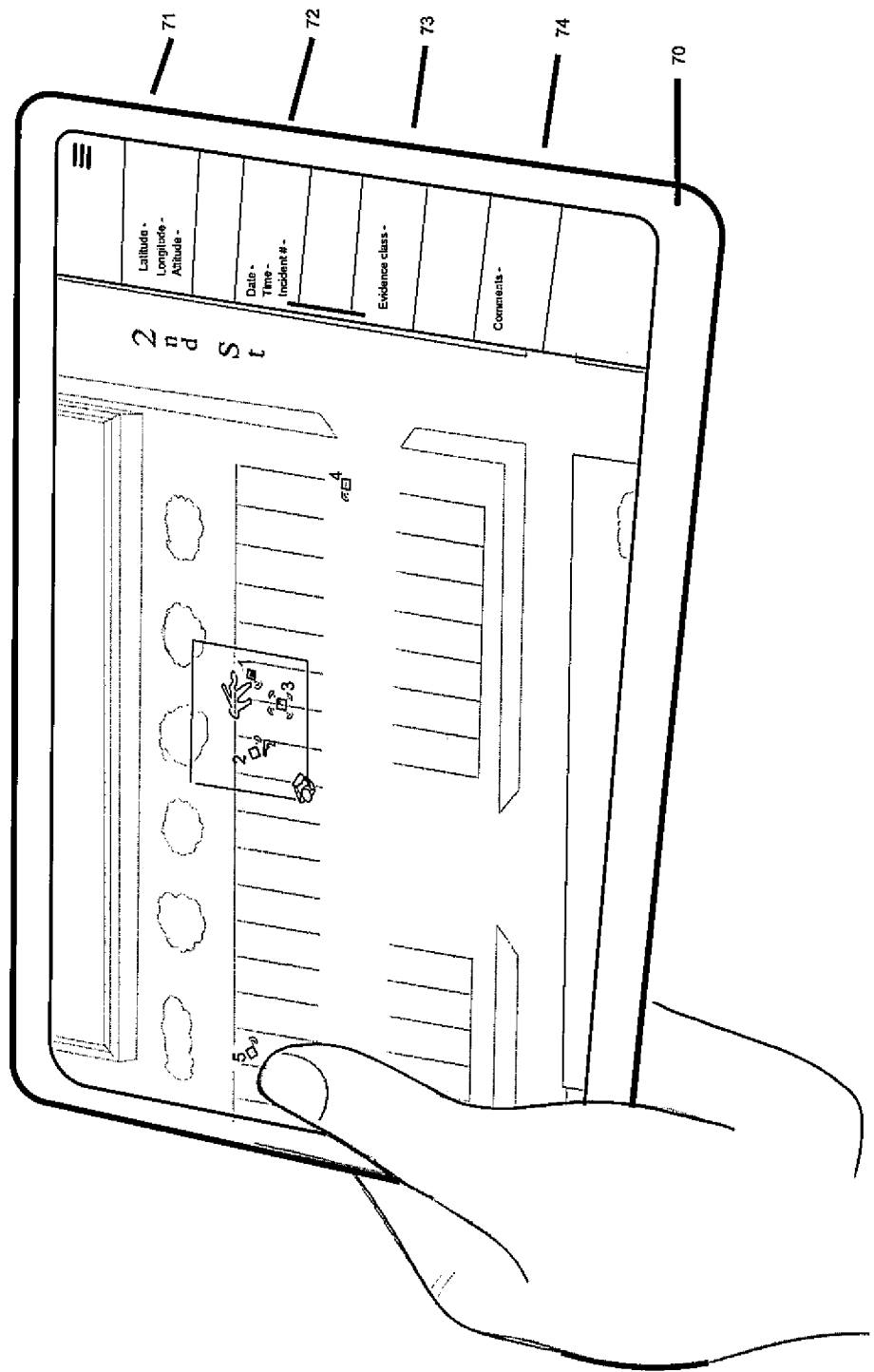
FIG. 7 is a screen shot of the user interface.

Referring next to FIG. 7 the portable electronic device screen 70 may look like this. The latitude, longitude and altitude field 71 is key. The time and date are shown in field 72. All this data could come from the RTK/GNSS processor 6. The classification of evidence such as "weapon" shows in field 73. Comments are entered in field 74 such as "distance to traffic light is 52 feet".

Figure 8:
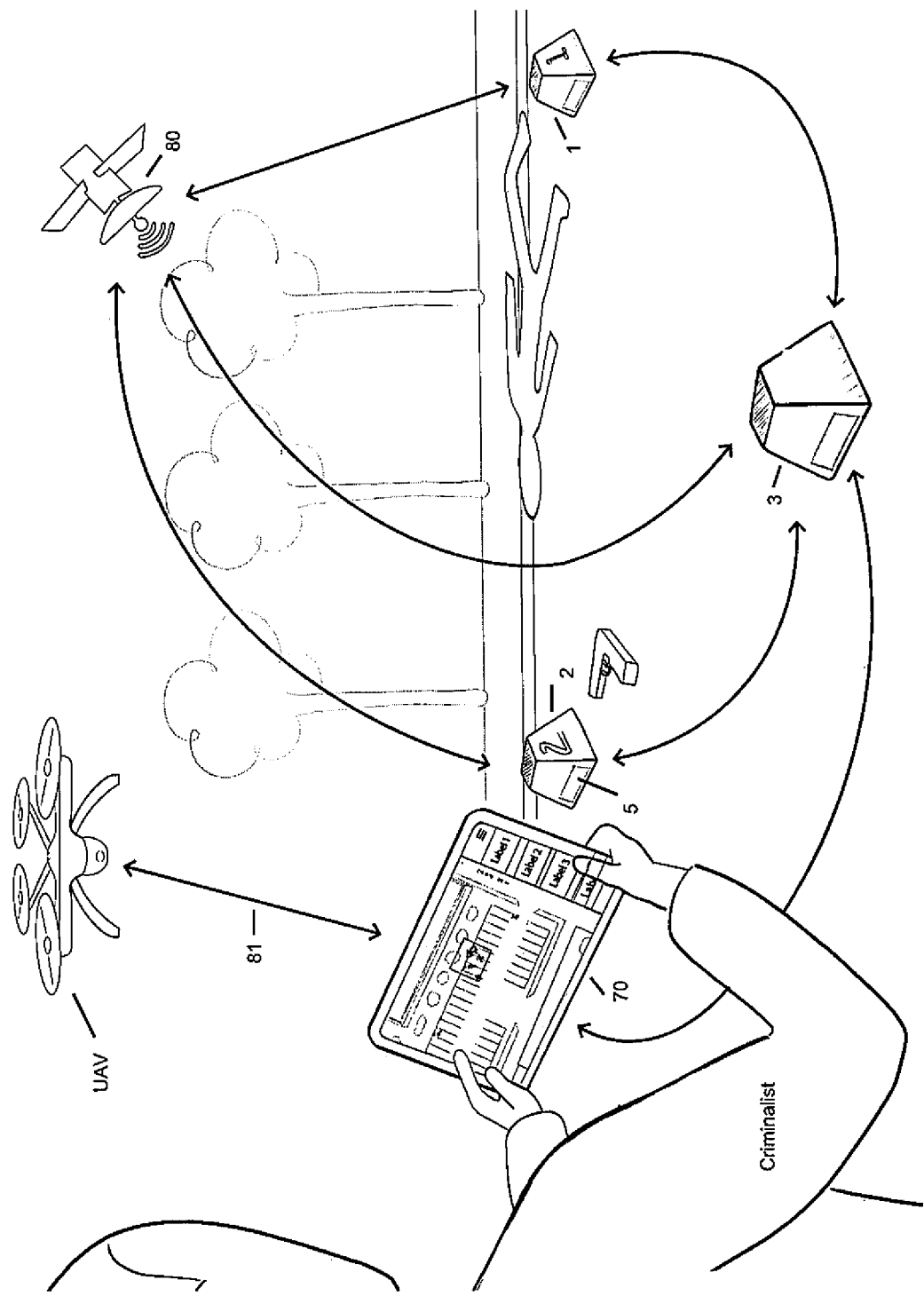
FIG. 8 is a sketch of a crime scene with a criminalist using the system.

In FIG. 8 the criminalist has placed each evidence marker 1 at the evidence locations. Criminalist has also put an optional large number identifier on each marker (1, 2, 3). The satellite 80 represents the GNSS satellite constellation that communicates with each processor 6. Criminalist launches UAV into sky above the field of evidence. The UAV relays 81 photographs and videos to the portable electronic device. Each screen 5 is photographed by the Criminalist. Optionally all the processor 6 data is communicated to the portable electronic device 70. Optionally all that data plus the manually input data (fields 73,74) can be sent to a cloud based storage system.

Figure 9A:
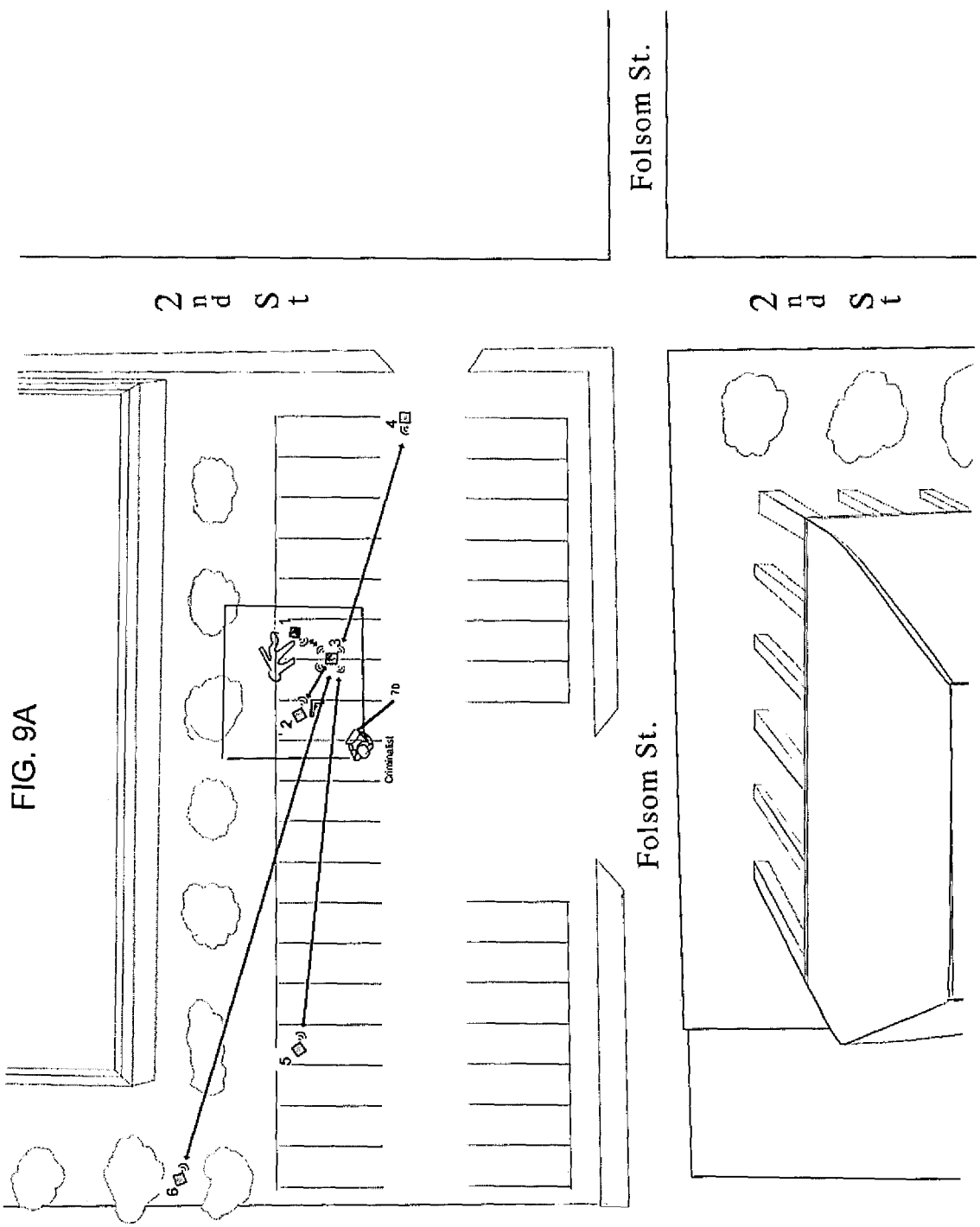
FIG. 9A is a sketch of a crime scene.

In FIG. 9A additional landmark markers 4, 5, 6 have been set up by the Criminalist. These may indicate additional items of evidence or landmarks. The UAV comprehensively memorializes the field of evidence.

Figure 9B:
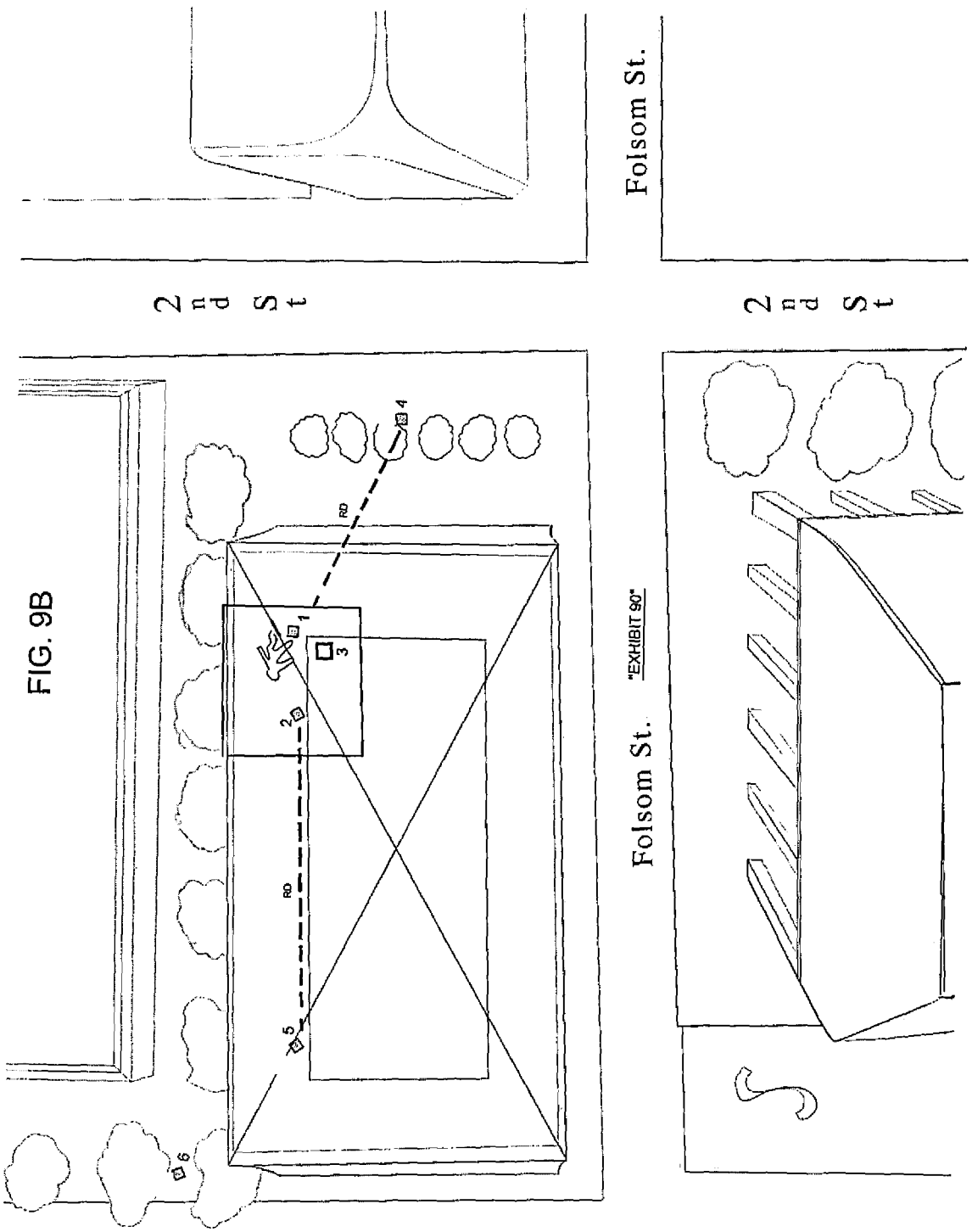
FIG. 9B is a computer generated depiction of the crime scene years later with considerable landscape changes.

In FIG. 9B a rendering of the actual crime scene years later is designated "Exhibit 90". Software has used the RTK/GNSS coordinates to accurately display the local geography like "Folsom St." A building and landscaping have replaced what was a parking lot when the alleged offense occurred. All relative distances "RD" can be indicated.

The Criminalist can use very accurate local crime scene recreation 9B to instruct a jury and aid in crime scene analysis.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

The present invention requires an accuracy of plus or minus one centimeter. One embodiment could have a RTK/GNSS held nearby the stand and communicating to the screen on the stand. This possibly could reduce a multi-stand cost factor with one active RTK/GNSS sensor moved from stand to stand.

I claim:

1. An evidence marker system comprising:
   a stand suited to stay on a support surface;
   a RTK/GNSS receiver and transmitter with a screen showing longitude, latitude, altitude of the stand on a screen on the stand; and
   an input device to the RTK/GNSS receiver to enter data which is displayed on the screen.

2. The evidence marker system of claim 1, wherein the RTK/GNSS receiver further comprises an accuracy of ±one centimeter.

3. The evidence marker of claim 2, wherein the stand further comprises a cone shape with a base having four sides and a flat top about six inches above the base.

4. The evidence marker of claim 3, wherein the base further comprises one side having a ruler marking.

5. A method to capture and store a location for evidence at a crime scene, the method comprising the steps of:
   a. forming an evidence marker having a RTK/GNSS receiver with a screen;
   b. placing the evidence marker at a piece of evidence at a crime scene;
   c. entering an identification symbol of the piece of evidence into the RTK/GNSS receiver;
   d. displaying a longitude, latitude, altitude and the identification symbol on the screen as well as time and date;
   e. photographing the screen and the field of evidence; and
   f. storing and using the photograph in a crime scene analysis.

6. The method of claim 5 further comprising the step of using a RTK/GNSS receiver with an accuracy of at least ±one centimeter.

7. The method of claim 5 further comprising the step of transmitting the longitude, latitude, altitude and identification symbol (the transmitted data) from the RTK/GNSS receiver to a local portable electronic device which stores the transmitted data.

8. The method of claim 7 further comprising the step of using a UAV with a camera and transceiver to photograph the crime scene and collect data from the RTK/GNSS receiver.

9. The method of claim 7 further comprising the step of displaying the transmitted data on the portable electronic device.

10. The method of claim 9 further comprising the step of transmitting the transmitted data from the portable electronic device to a central processor.

11. The method of claim 10 further comprising the step of utilizing the transmitted data in a crime scene analysis.

12. The method of claim 6 further comprising the step of forming a plurality of evidence markers and placing one evidence marker at each piece of evidence at the crime scene.

13. The method of claim 12 further comprising the step of entering into the RTK/GNSS receiver data regarding evidence description, weather and comments.

14. The method of claim 13 further comprising the step of using a local portable electronic device to wirelessly enter data into the RTK/GNSS receiver.

15. A method to recreate locations of a plurality of pieces of evidence at a crime scene, the method comprising the steps of:
   a. forming an evidence marker having an integral RTK/GNSS receiver for each piece of evidence at a crime scene;
   b. placing each evidence marker at each piece of evidence at the crime scene;
   c. entering into each RTK/GNSS receiver an identification symbol and/or comments for the piece of evidence adjacent that RTK/GNSS receiver;
   d. displaying the identification symbol and the longitude, latitude and altitude of each evidence marker on a screen on the respective evidence marker; and
   e. capturing all the identification symbols and the respective longitude, latitude and altitude data and time and date for all the evidence markers.

16. The method of claim 15 further comprising the step of photographing each screen as a means of capturing in step (e).

17. The method of claim 15 further comprising the step of transmitting from the RTK/GNSS receiver to a local portable electronic device as a means of capturing in step (e).

18. The method of claim 17 further comprising the step of transmitting all the data received by the local portable electronic device to a remote processor.

19. The method of claim 18 further comprising the step of utilizing all the received data at the remote processor to analyze location data of the crime scene.

20. The method of claim 19 further comprising the step of utilizing all data from all evidence markers at one crime scene to analyze location data of the crime scene indicating geographical crime scene changes from an earlier date.

* * * * *